United States Patent [19]
Salmonsen et al.

[11] Patent Number: 5,888,279
[45] Date of Patent: Mar. 30, 1999

[54] ASPHALT RELEASE AGENT FOR TRUCK BEDS

[75] Inventors: Steven Todd Salmonsen, Groveland, Mass.; Michael Dean Frailey, Rock Hill, S.C.; James Joseph Proctor, Denver, Colo.; Lawrence Paul Krantz, Cincinnati, Ohio; Susan Marie Crooks, Salisbury, Mass.

[73] Assignee: Morton International, Inc., Chicago, Ill.

[21] Appl. No.: 130,006

[22] Filed: Aug. 6, 1998

Related U.S. Application Data

[62] Division of Ser. No. 960,883, Oct. 30, 1997.
[51] Int. Cl.$^6$ ....................................................... B08B 3/02
[52] U.S. Cl. .............................. 106/2; 524/277; 524/376; 524/377; 510/366; 510/433
[58] Field of Search .............................. 106/2; 427/388.4, 427/407.1, 409; 524/277, 376, 371; 134/4; 510/366, 245, 433, 528

[56] References Cited

U.S. PATENT DOCUMENTS

| 4,005,020 | 1/1977 | McCormick | 134/30 |
| 4,374,222 | 2/1983 | Meyer | 524/241 |

*Primary Examiner*—Melissa Kaslow
*Attorney, Agent, or Firm*—Steven C. Benjamin; Gerald K. White

[57] ABSTRACT

An asphalt release agent for preventing hot road asphalt, especially polymer-modified asphalt, from sticking to surfaces of delivery truck beds is provided. The release agent includes a water-based mixture of polycycloaliphatic amines and polyalkylene glycols. The release agent is applied onto the truck beds to create a slippery non-stick surface so that the road asphalt which comes in contact with such truck bed surfaces will not adhere.

16 Claims, No Drawings

ASPHALT RELEASE AGENT FOR TRUCK BEDS

This is a Divisional of copending application Ser. No. 08/960,883, filed on Oct. 30, 1997.

FIELD OF THE INVENTION

This invention relates to asphalt release agents for use in preventing asphalt compounds such as road asphalt from sticking to equipment used to transport the asphalt such as truck beds. It relates more particularly to asphalt release agents that are especially effective in preventing the more tenacious polymer-modified road asphalt from sticking.

BACKGROUND OF THE INVENTION

Most roadways throughout the world are paved with asphalt concrete mixes. Typically, the hot asphalt road mix containing asphalt cement, aggregate, and antistripping agents is produced at an asphalt plant and transported to the construction site in the beds of dump trucks. One of the problems encountered in delivering road asphalt in dump trucks is that the asphalt tends to stick to the metal surfaces of the truck beds. Making this problem worse is the recent trend toward the use of polymer-modified road asphalt mixes which form more tenacious bonds with the truck bed surfaces.

The sticking prevents the asphalt from smoothly sliding out as the dump truck discharges its load. Workers are thus required to expend considerable time and energy to manually scrape the asphalt out of the truck bed with shovels. Most often, however, solidified pieces of asphalt remain adhered to the bed despite the workers best efforts. Asphalt is wasted and material usage suffers. Furthermore, as the hardened deposits build up in the truck bed, the quality of subsequent road mixes is also affected. The adherent pieces eventually fall off as large solid inclusions in subsequent road mixes. Often, the inclusions cause the road paving equipment to tear up the road membrane as the asphalt is laid down.

One approach taken to solve this problem has been to spray asphalt release agents over the truck bed surfaces to prevent asphalt adherence. A popular asphalt release agent used in the past was hydrocarbon fuel such as ordinary diesel fuel. Diesel fuel was extremely effective in cutting and dissolving the asphalt in order to prevent it from sticking. However, diesel fuel has since been outlawed as an asphalt release agent. It presented too many soil and ground water contamination risks and also when not used properly decomposed the asphalt. Other fuel-based release agents such as hydrocarbon wax emulsions have been banned as well, since they also damaged the structural integrity of the contacted asphalt, resulting in inferior and shorter-lasting roads. Furthermore, all release agents which rely upon decomposition or degradation of the contacted asphalt are no longer considered desirable.

Non-fuel based asphalt release agents which provide slippery surfaces on the truck bed to prevent the asphalt from sticking without decomposing the asphalt have also been tried. For instance, U.S. Pat. No. 5,332,554 (DeLong) discloses a foam asphalt release agent including an aqueous solution of an inorganic salt, such as magnesium chloride or calcium chloride, together with a foaming agent, such as an anionic isopropyl alcohol surfactant, a metal corrosion inhibitor, such as sodium phosphate ester, and optional dye. U.S. Pat. No. 5,494,502 (DeLong) discloses another non-fuel based foam asphalt release agent including an aqueous mixture of a fatty oil, together with a foaming agent, such as an anionic surfactant, optional emulsion stabilizer, such as crosslinked polymer microgels, optional alkalinizing agent, such as triethanolamine, and optional preservative or antimicrobial agent, such as sodium benzoate. U.S. Pat. No. 5,407,490 (Zofchak) discloses still another asphalt release agent comprising a water-based mixture of monomethyl coconate esters together with ethoxylated sorbitan ester emulsifiers. These non-fuel based release agents, however, suffer from not being especially effective in releasing the more tenaciously adhered pieces of polymer-modified asphalt from the truck beds, which traditionally have been more difficult to handle. Other non-fuel based release agents have also been tried, but most of these suffer from being limited in ineffectiveness, environmentally hazardous, thermally unstable, costly, or complex in preparation, delivery, or application.

It would be desirable to provide a more effective asphalt release agent which does not suffer from the foregoing disadvantages. Yet, from a practical standpoint, this is difficult because of the stringent requirements that must be satisfied. For instance, economics are extremely important in the asphalt industry due to the large scale of potential application. Thus, any material proposed for use as an asphalt release agent must be very inexpensive, which eliminates many potential candidates. Another important criteria is that the release agent must be derived from relatively high boiling, thermally stable materials that will not substantially decompose and volatilize when contacted with the hot asphalt road mix, which is usually loaded at the asphalt plant onto the truck beds at temperatures typically above 325° F. The release agent should also have a sufficiently high flash point to avoid flammability hazards which may be encountered at the asphalt plant or construction site. Moreover, the release agent should be environmentally friendly, physiologically safe, relatively non-corrosive to human skin, easy to prepare, deliver and apply even in extreme cold weather conditions, and should not degrade the contacted asphalt in any manner that would impair the road quality. And all of the above requirements must be satisfied, while also providing a material possessing effective asphalt release action, especially with respect to polymer-modified asphalt.

What is needed is an asphalt release agent that is exceptionally effective in preventing the sticking of asphalt, especially asphalt containing polymers, to truck beds and other surfaces, is environmentally friendly and physiologically safe, is inexpensive, is easy to prepare, deliver and apply even in extreme cold temperatures, is thermally stable and long-lasting, is non-flammable, and does not compromise the quality of asphalt laid down in the road.

SUMMARY OF THE INVENTION

It is an object of this invention, therefore, to provide an asphalt release agent which does not suffer from the foregoing drawbacks.

It is another object of this invention to provide an asphalt release agent that is effective in preventing asphalt, especially polymer-modified asphalt, from adhering to truck beds and other surfaces with which the asphalt comes in contact, essentially by making the contact surface slippery, without decomposing or otherwise impairing the structural integrity of the asphalt and the quality of road surfaces produced therefrom.

Yet another object of this invention is to provide an asphalt release agent that is easy to prepare, deliver and apply, even in extreme cold weather.

Still another object of this invention is to provide an asphalt release agent that is environmentally friendly and physiologically safe.

And still another object of this invention is to provide an asphalt release agent that is heat stable and lasts a long time on the surface without flashing or washing off in the asphalt.

Still another object of the invention is to provide an asphalt release agent that is environmentally safe and economical in manufacture.

A related object of this invention is to provide a method for preventing asphalt from sticking to truck beds or other surfaces which come in contact with asphalt by applying the asphalt release agent of the aforesaid character as a thin coating over such surfaces.

The aforesaid and other objectives are achieved by a water-based asphalt release agent which comprises a generally thermally stable, flowable, inexpensive, non-degrading to asphalt, environmentally friendly, water-based mixture of certain polycycloaliphatic amines and polyalkylene glycols.

The various objects, features and advantages of this invention will become more apparent from the following description and appended claims.

DETAILED DESCRIPTION OF THE PREFERRED EMBODIMENTS OF THE INVENTION

Throughout this specification, all parts and percentages specified herein are by weight unless otherwise stated.

In a broad aspect, this invention provides a water-based asphalt release agent and a method for applying the same to asphalt contact surfaces, such as the bed of a truck, the walls of storage and shipping containers, and other metal and non-metal surfaces that come in contact with asphalt, to prevent the asphalt, especially tenacious polymer-modified asphalt, from sticking to the so treated surfaces. For this purpose, there is deposited on the surface to be treated a thin coating of the asphalt release agent of this invention before the asphalt is loaded. Once applied, the asphalt release agent forms a slippery coating over the contact surface which prevents the asphalt from sticking to the surface, without significantly dissolving, softening, or decomposing the contacted asphalt.

As stated above, the release agent does not decompose or otherwise degrade the asphalt. Rather, it is believed to function as a surfactant to reduce the interfacial tension between the asphalt and contact surface which prevents bond formation at the interface and destroys any bonds previously formed. The release agent is also believed to function as a lubricant to reduce the friction between the asphalt and the contact surface. The release agent thus forms a slippery film which prevents the hot sticky asphalt from adhering to the surface.

Broadly described, the asphalt release agent of this invention comprises water-based mixtures of certain polyamines and polyglycols.

The polyamines particularly useful in the practice of this invention are polycycloaliphatic amines, especially polycycloaliphatic primary amines such as aminoalkylcyclohexylamines, aminoaralkylcyclohexylamines, and, for most effective action, mixtures thereof. More specifically, these polycycloaliphatic primary amines can be generally chemically characterized as poly(primary)aminocycloaliphatic substituted cycloaliphatic amines, aromatic amines, methylene bridged cycloaliphatic amines, methylene bridged aromatic amines, or methylene bridged mixed cycloaliphatic/aromatic amines, where poly refers to a minimum of two substituents and a maximum limited only by the possible open chemical positions.

Examples of suitable aminoalkylcyclohexylamines include, 4,4'-methylenebis(cyclohexylamine), 4-[(4-aminocyclohexyl)methyl]-cyclohexanol, 2,4-bis[(4-aminocyclohexyl)methyl]-cyclohexylamine, 4-[4-aminocyclohexyl)methyl-N-[4-[(4-aminocyclohexyl)methyl]cyclohexyl]-cyclohexylamine, and the like. Examples of suitable aminoaralkylcyclohexylamines include 4-(p-aminobenzyl)cyclohexylamine, 2,4-bis(4'-aminocyclohexyl)aniline, 2,4'-bis(4"-aminocyclohexyl)-2', 4-methylenedianiline, and the like. Monocycloaliphatic amines such as cyclohexylamine may also be included. It should be understood that presumably any cycloaliphatic primary amine with a sufficiently high boiling point to minimize volatility losses and avoid flammability hazards could be useful herein. Commercial mixtures of aminoalkylcyclohexylamines and aminoaralkylcyclohexylamines are sold under the trade name "Mixed Polycycloaliphatic Amines" or "MPCA" by Air Products of Allentown, Pa.

The polycycloaliphatic amines impart surfactant and lubricant characteristics to the release agent. They generate the slippery surface to which the asphalt will not stick. They also prevent the formation of bonds between the asphalt and contact surface. The polycycloaliphatic amines may comprise 100 wt. % of the active ingredient present in the release agent. However, it is preferred to cut them with polyglycols for most effective action.

The polyglycols particularly useful in the practice of this invention are polyalkylene glycols, especially polyalkylene glycols having 2 to 6–8 carbon atoms in the alkylene group. Examples of suitable lower polyalkylene glycols (n=2–4) include diethylene glycol, triethylene glycol, tetraethylene glycol, dipropylene glycol, tripropylene glycol, and, for most effective action, mixtures thereof. Higher molecular weight polyalkylene glycols (n≧5) such as polyethylene glycols, polypropylene glycols, or mixed polyethylene/polypropylene glycols, and mixtures thereof, are generally preferred due to lower volatilities, but, if desired, monoalkylene glycols can also be employed. Commercial mixtures of the higher polyalkylene glycols are sold under the trade name "Glycol Bottoms" or "O-265" by KMCC of Houston, Tex.

The polyalkylene glycols render the water-insoluble liquid polyamines water-reducible, that is, stably dispersible in aqueous systems. In addition, they effectively reduce the viscosity of the release agent to facilitate spray application, while also providing some additional release action. The polyalkylene glycols further serve to render the release agent sufficiently non-corrosive. Moreover, the polyalkylene glycols depress the freezing point of the release agent which allows for it to be applied in extreme cold weather conditions.

According to this invention, the relative proportions of the active ingredients contained in the release agent generally range from about 1–99 wt. % of polycycloaliphatic amine to about 99–1 wt. % of polyalkylene glycol, and, preferably, from about 30–70:70–30, and the optimum limits are believed to be about 50:50 (equal parts).

The final ingredient of the asphalt release agent of this invention is water. Water provides an environmentally friendly and stable delivery system for the release agent and also facilitates uniform spray application. The release agent of this invention is an aqueous mixture generally containing from about 1 to 99 wt. % water, and, preferably, from about 40 to 80 wt. %, and the optimum limits are believed to be about 50–60 wt. %, with the balance being the above recited active ingredients in the given proportions. Dilution with at least 40 wt. % water is generally preferred for spray application.

The release agent may be manufactured and stored as a concentrate of polycycloaliphatic amine and polyalkylene glycol. The water to dilute the mixture to the appropriate concentration to form a suitably stable, flowable, dispersion can be added before shipping or at the site of application. It is preferred that some dilution is done before shipping rather than on-site to maintain product consistency and assure ease of use. Final dilution can then be easily performed at the application site.

In any event, the ingredients are blended together in sufficient amounts to form a suitably flowable, sprayable, stable, homogeneous, dispersion at room temperature. The proportions of the ingredients may be varied rather widely as will be readily apparent to persons skilled in the art; however, the best results are obtained with the ingredients in the concentrations set forth herein. It is most desirable, on the one hand, to avoid the formation of highly viscous, generally unpumpable and unsprayable mixtures. On the other hand, cloudy, non-homogeneous, emulsified mixtures that are sprayable can be handled with suitable agitation prior to application.

According to the preferred method of this invention, the asphalt release agent of the aforesaid character is applied as a thin coating onto the surfaces of a truck bed before a hot asphalt road mix is loaded. Any conventional coating method can be used to apply the release agent, such as rolling, spraying, brushing, wiping, or dipping, although spraying through a nozzle of a standard spray gun is preferred. For more viscous mixtures, it may be desirable to agitate or heat to reduce the viscosity before spraying. For emulsified mixtures, agitation is also recommended before spraying to redisperse the separated phases. After application, a slick film having a low coefficient of friction and bond breaking properties coats the surface of the truck bed. The asphalt road mix is then loaded onto the truck bed and delivered to the construction site. As the truck bed is unloaded, the asphalt slides out of the bed without sticking. The truck bed is left with a clean and shiny surface ready for the next application. The asphalt release agent can also be applied to already adhered asphalt on truck bed to remove the asphalt.

The asphalt release agent of this invention is effective in preventing the sticking of asphalt, especially asphalt containing polymers, to truck beds and other surfaces, is environmentally friendly and physiologically safe, is very inexpensive, is easy to prepare, deliver and apply even in extreme cold temperatures, is thermally stable and long-lasting, and does not compromise the quality of asphalt laid down in the road.

Although this release agent is specifically designed for use with asphalt, it has utility as a release agent for other solid and semi-solid substances, such as bitumens, resins, tars, molded rubber, molded plastic, and it also has utility in a wide variety of applications.

This invention will be further clarified by a consideration of the following example, which is intended to be purely exemplary of the invention.

EXAMPLE

Water-based asphalt release agents for truck beds were prepared by blending together the following ingredients in the relative parts indicated:

| Sample | | | Viscosity[2] | Stability[4] | Release Potential[6] |
|---|---|---|---|---|---|
| MPCA[1] | O-265[2] | H$_2$O | 25° C. | 25° C. | 150° C. |
| 45 | 45 | 10 | 2060 cp | no phase separation | asphalt slides easily |
| 40 | 40 | 20 | 420 cp | no phase separation | asphalt slides easily |
| 37.5 | 37.5 | 25 | 340 cp | no phase separation | asphalt slides easily |
| 35 | 35 | 30 | 260 cp | no phase separation | asphalt slides easily |
| 30 | 30 | 40 | 180 cp | no phase separation | asphalt slides easily |
| 25 | 25 | 50 | 180 cp | no phase separation | asphalt slides easily |
| 20 | 20 | 60 | <180 cp | immediate separation | minor sticking of asphalt |
| 15 | 15 | 70 | <180 cp | immediate separation | minor sticking of asphalt |
| 10 | 10 | 80 | <180 cp | immediate separation | too dilute, heavy sticking of asphalt |
| 5 | 5 | 90 | <180 cp | immediate separation | too dilute, heavy sticking of asphalt |

[1]MPCA is a commerical mixture of the following polycycloaliphatic amines that is sold by Air Products of Allentown, PA:

| Ingredient | CAS No. | Range (%) |
|---|---|---|
| 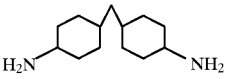 | 1761-71-3 | 2–10 |
| 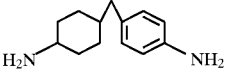 | 26480-77-5 | 5–17 |
| 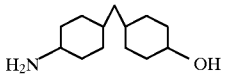 | 52314-58-6 | 0.5–2 |
| 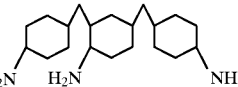 | 25131-42-4 | 15–22 |
| 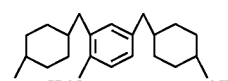 | None | 35–50 |
| 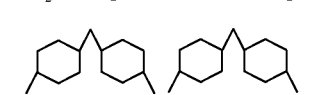 | 69868-18-4 | 8–20 |
|  | None | 3–8 |

[2]O-265 Glycol Bottoms is a commerical mixture of higher polyalkylene glycols that is sold by KMCO of Houston, TX.
[3]Viscosity. The viscosity data for each sample was gathered at about 25° C. using a Brookfield Viscometer (Model DV-II+) having a spindle size of #6 and a speed of 50 rpm. The spindle was immersed in the sample and rotated at 50 rpm for approximately 5 minutes, while the digital readout stabilized, before measurements were recorded.
[4]Stability. All samples were prepared at about 100° C. and then poured into containers and capped. After reaching room temperature, the sample containers were agitated and then left still on the bench for observation of phase separation. The samples from 90/10 to 60/40 of active ingredient to water remained homogeneous with no visible signs of separation. The 50/50 sample showed signs of phase separation within 24 hours. Samples 40/60 to 10/90 had immediated phase separation. This phase separation is not a problem as the product is agitated while being pumped right at the hot mix plant or construction site.

-continued

[5] Release potential. All the water diluted samples were spread out evenly in shallow metal pans, then placed in an oven at about 150° C. for approximately 1 hour. About 50g of hot (about 150° C.) asphalt cement (AC-20) was poured over the hot release agent in the pans. The pans were then held at about a 45 degree angle. Any slipping or sticking of the asphalt cement was observed at this point. All the samples from 90/10 to 30/70 of active ingredient to water performed well in this test. The asphalt cement slid easily along the release agent on the pan. Also, at room temperature, the asphalt cement was easily lifted off the surface of the pans. The more dilute 20/80 and 10/90 samples were less effective in releasing the asphalt.

From the foregoing it will be seen that this invention is one well adapted to attain all ends and objects hereinabove set forth together with the other advantages which are apparent and inherent. Since many possible variations may be made of the invention without departing from the scope thereof, the invention is not intended to be limited to the embodiments and examples disclosed, which are considered to be purely exemplary. Accordingly, reference should be made to the appended claims to assess the true spirit and scope of the invention, in which exclusive rights are claimed.

What is claimed is:

1. An asphalt release agent, comprising:
   an aqueous mixture of a polycycloaliphatic amine and a polyalkylene glycol.

2. The release agent of claim 1, in which:
   said polycycloaliphatic amine is a primary amine selected from the group consisting of aminoalkylcyclohexylamines, and aminoaralkylcyclohexylamines, and mixtures thereof.

3. The release agent of claim 1, in which:
   said polycycloaliphatic primary amine is selected from the group consisting of poly(primary) aminocycloaliphatic substituted cycloaliphatic amines, aromatic amines, methylene bridged cycloaliphatic amines, methylene bridged aromatic amines, and methylene bridged mixed cycloaliphatic/aromatic amines, and mixtures thereof.

4. The release agent of claim 2, in which:
   said polycycloaliphatic primary amine is selected from the group consisting of 4,4'-methylenebis (cyclohexylamine), 4-[(4-amiyocyclohexyl)methyl]-cyclohexanol, 2,4-bis[(4-aminocyclohexyl)methyl]-cyclohexylamine, 4-[4-aminocyclohexyl) methyl-N-[4-[(4-aminocyclohexyl)methyl]cyclohexyl]-cyclohexylamine, 4-(p-aminobenzyl)cyclohexylamine, 2,4-bis(4'-aminocyclohexyl)aniline, and 2,4'-bis (4"-aminocyclohexyl)-2',4-methylenedianiline, and mixtures thereof.

5. The release agent of claim 1, in which:
   said polyalkylene glycol is selected from the group consisting of polyalkylene glycols having 2 to 8 carbon atoms in the alkylene group, and mixtures thereof.

6. The release agent of claim 5, in which:
   said polyalkylene glycols are selected from the group consisting of lower polyalkylene glycols and higher polyalkylene glycols, and mixtures thereof.

7. The release agent of claim 6, in which:
   said polyalkylene glycols comprise higher polyalkylene glycols selected from the group consisting of polyethylene glycols, polypropylene glycols and mixed polyethylene/polypropylene glycols, and mixtures thereof.

8. The release agent of claim 1, in which:
   said polycycloaliphatic amine and said polyalkylene glycol are present in relative proportions of from about 1:99 wt. % to about 99:1 wt. %.

9. The release agent of claim 1, in which:
   said polycycloaliphatic amine and said polyalkylene glycol are present in about equal relative wt. proportions.

10. The release agent of claim 1, in which:
    said release agent is from about 1 to about 99 wt. % water.

11. The release agent of claim 9, in which:
    said release agent is from about 40 to about 80 wt. % water.

12. An asphalt release agent, comprising a mixture of:
    a) between about 1 and about 99 wt. % of active ingredient, said active ingredient comprising:
       i) between about 1 and about 99 wt. % of at least one polycycloaliphatic primary amine selected from the group consisting of aminoalkylcyclohexylamines, and aminoaralkylcyclohexylamines, and mixtures thereof, and
       ii) between about 1 and about 99 wt. % of at least one polyalkylene glycol selected from the group consisting of lower and higher polyalkylene glycols having 2 to 8 carbon atoms in the alkylene group, and mixtures thereof; and,
    b) between about 1 and about 99 wt. % of water.

13. The release agent of claim 12, comprising a mixture of:
    a) between about 20 and about 60 wt. % of said active ingredient, said active ingredient comprising:
       i) between about 30 and about 70 wt. % of said at least one polycycloaliphatic primary amine, and
       ii) between about 30 and about 70 wt. % of said at least one polyalkylene glycol; and,
    b) between about 40 and about 80 wt. % of water.

14. The release agent of claim 13, in which:
    said at least one polycycloaliphatic primary amine is selected from the group consisting of 4,4'-methylenebis (cyclohexylamine), 4-[(4-aminocyclohexyl) methyl]-cyclohexanol, 2,4-bis[(4-aminocyclohexyl)methyl]-cyclohexylamine, 4-[4-aminocyclohexyl)methyl-N-[4-[(4-aminocyclohexyl)methyl]cyclohexyl]-cyclohexylamine, 4-(p-aminobenzyl)cyclohexylamine, 2,4-bis (4'-aminocyclohexyl)aniline, and 2,4'-bis(4"-aminocyclohexyl)-2',4-methylenedianiline, and mixtures thereof.

15. The release agent of claim 14, in which:
    said at least one polyalkylene glycol is selected from the group consisting of higher polyethylene glycols, polypropylene glycols, and mixed polyethylene/polypropylene glycols, and mixtures thereof.

16. The release agent of claim 15, in which:
    said active ingredient comprises about a 50:50 wt. % mixture of said at least one polycycloaliphatic primary amine and said at least one polyalkylene glycol.

* * * * *